July 7, 1936.  G. LAVENBURG  2,046,471

ELECTRIC TOASTER

Filed April 5, 1933  3 Sheets-Sheet 1

George Lavenburg
INVENTOR

BY
ATTORNEY

July 7, 1936.  G. LAVENBURG  2,046,471
ELECTRIC TOASTER
Filed April 5, 1933  3 Sheets-Sheet 2

George Lavenburg
INVENTOR

BY
ATTORNEY

July 7, 1936.   G. LAVENBURG   2,046,471
ELECTRIC TOASTER
Filed April 5, 1933   3 Sheets-Sheet 3

George Lavenburg
INVENTOR

BY
ATTORNEY

Patented July 7, 1936

2,046,471

UNITED STATES PATENT OFFICE 2,046,471

ELECTRIC TOASTER

George Lavenburg, New York, N. Y.

Application April 5, 1933, Serial No. 664,493  REISSUED

9 Claims. (Cl. 161—16)

This invention relates to new and useful improvements in electric toasters and particularly to toasters of the so-called automatic type in which the operation once initiated is automatically terminated upon the expiration of a predetermined period of time.

The objects of the invention are the provision of a simple, rugged and inexpensive timing mechanism; the initiation of all operations by a single manual operation, e. g., by pulling down a single lever; means whereby the automatic timing of the toaster may be at times delayed, suspended, speeded up, or entirely replaced by manual operation without the necessity of performing any special operations; the provision of a toaster in which the bread gradually appears in view from the oven and continually moves during the toasting.

With these objects in view, I provide a timing-device which is mechanically at all times disconnected from the toaster and which in the present embodiment of the invention consists of a motor delivering impacts at a movable member which, after traveling a certain distance, terminates the toasting operation. In the present case, the impacts are delivered by means of a steel ball which the motor hurls against the movable member. The movable member is held in its advanced position and the ball is returned to the motor by gravity.

The bread and oven are gradually and continuously moved with respect to one another, preferably by raising the bread under the control of said movable member and the toasting operation is terminated when the movable member reaches a predetermined position. Owing to this continuous motion, the bread will be evenly toasted throughout its surface and the apparatus is never subjected to sudden jars. Besides, the operator may before the completion of the toasting determine its sufficiency.

The operation is initiated by a single manual operation, e. g., by pulling down a handle. This will lower the bread within the oven, advance said member into its starting position, close the circuits of the motor and the heating elements and thus start both the toasting and timing operations. Through the agency of said handle, the timing of the toasting operation is at all times under the control of the operator. By holding the handle, the impacts of the steel ball against the movable member become ineffective, and through the agency of the handle the operator may advance the movable member into its extreme position with the bread projecting from the oven and said circuits interrupted.

These and other features of the invention will more fully appear from the following description of a preferred embodiment thereof and the appended claims. Obviously, these details may be changed without departing from the spirit of the invention, and some of these features may be embodied in other types of toasters.

In the drawings, Fig. 1 is a vertical cross-section of a toaster;

Figure 1:
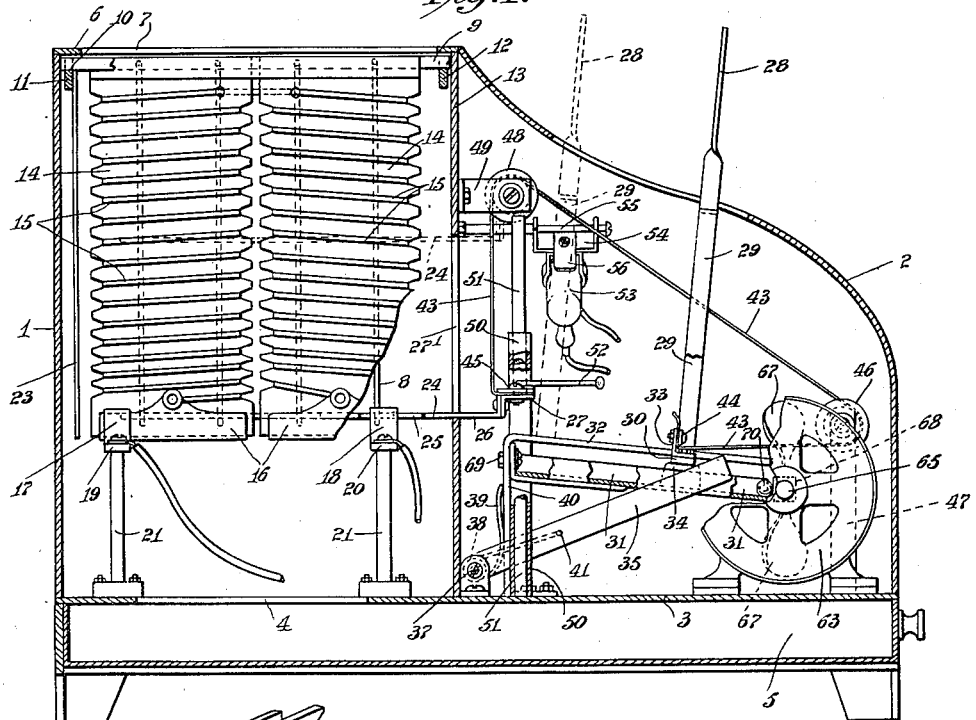
Figure 4:
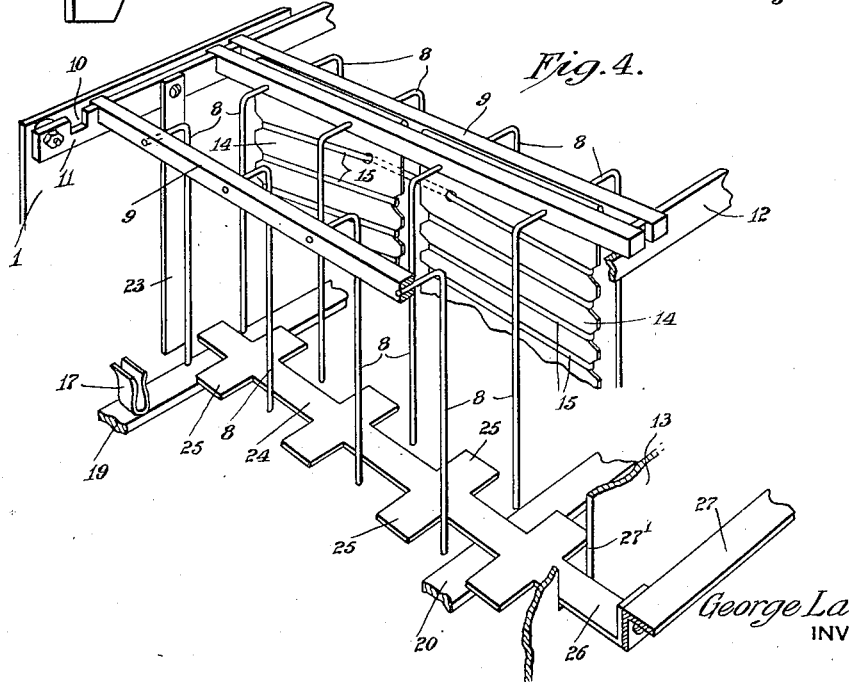
Fig. 4 is a perspective view of the oven section.
Figure 2:
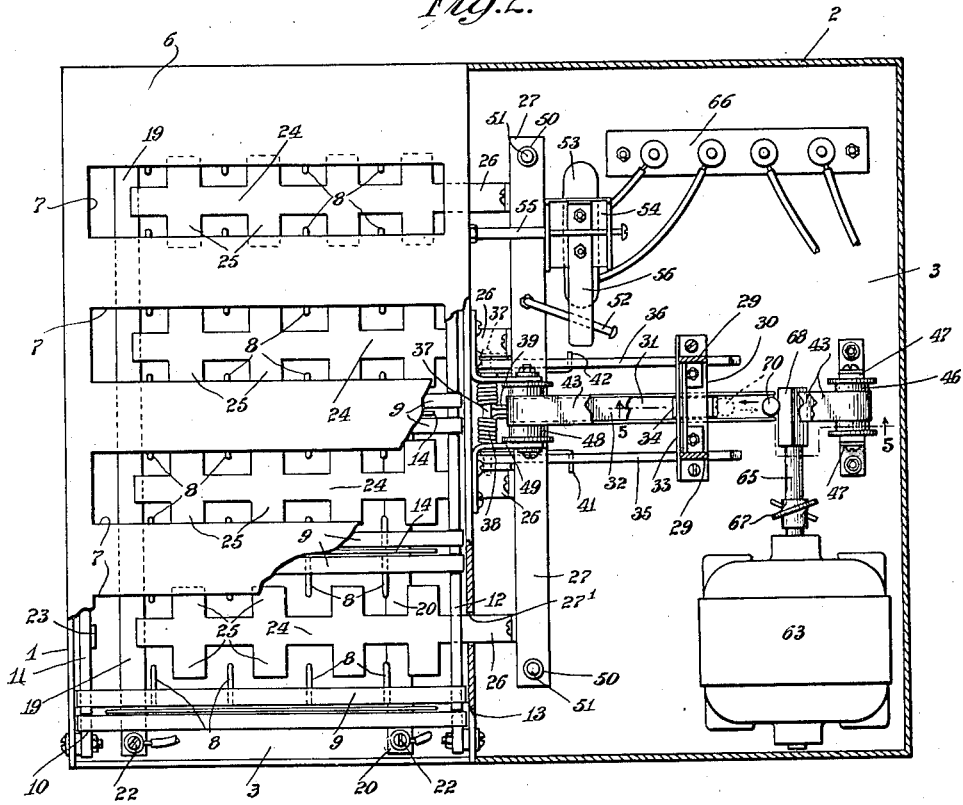
Fig. 2 is a top plan view with parts of the cover removed.

The toaster consists of an oven and an operating mechanism, the former enclosed within a casing 1 and the latter within a casing 2. Both casings are mounted on a common base 3 which is open below the oven, as indicated at 4, so that bread crumbs may fall through into a removable drawer 5. The top of the oven is covered by a plate 6 provided with four longitudinal slots or openings 7 in alignment with vertical oven compartments and of a size to permit free passage of a slice of bread. A slice of bread inserted through these openings will be guided between guard wires 8 suspended on both sides of each oven compartment from squared rods 9 one end of which rests in notches 10 provided in a rail 11 fastened to a side wall of the casing 1. The other ends of the bars 9 are supported in notches of a rail 12 mounted on a side wall 13 of the oven which separates the oven from the chamber enclosing the timing and controlling mechanism. The bars 9 are arranged in pairs, the bars of each pair being spaced from one another to hold the upper edge of a heating element composed of two notched mica sheets 14 on which a resistance wire 15 is wound. The two ends of the resistance wire terminate in metal tabs 16 at the bottom of the mica sheets 14, the metal tabs being held in connecting clips 17 and 18, respectively, mounted on conductor rails 19 and 20 carried on posts 21 on the base plate 3 but insulated therefrom. Current is supplied to the rails 19 and 20 through binding posts 22. It will be noted that the bars 9 with the guards 8 are removable and the heating elements are also removably mounted in the clips so as to insure quick and easy removal and change which can be effected simply by removing the oven top 6.

The guards 8 prevent the bread from coming in contact with the heating elements, and strips like 23 depending from the rail 11 keep the bread from sliding into contact with the side wall of the casing 1. Each slice of bread will rest on a bread platform 24, the bread platform having projections 25 between adjacent guard wires 8 to prevent slipping of the bread off the platform and into contact with the heating element between adjacent guard wires.

Each bread platform 24 has an extension 26 projecting through a longitudinal slot in the separating wall 13, all the extensions 26 being fastened to a crossbar 27.

In their normal position, the bread platforms are in the position indicated in dotted lines in Fig. 1. After a slice of bread has been inserted within each oven compartment and is resting on its platform 24, the attendant lowers the bread entirely within the oven and starts the operation of the toaster by grasping a handle 28 and moving it from the position indicated in dotted lines in Fig. 1 into the position indicated in full lines. The handle projects through a slot in the top of the casing 2. Its forked end 29 within the casing 2 is fastened to the two ends of a cross piece 30. The cross piece 30 is adapted to slide back and forth between the top edge of a trough 31 and a cover plate 32 which is straddled by a bent-up portion 33 of the cross piece 30. Fastened to the lower end of the cross piece 30 there is a slider 34 within the trough 31 and the two ends of the cross piece are engaged at their under side on both sides of the trough 31 by levers 35 and 36. The ends of these levers are pivotally mounted on a shaft 37 which is encircled by a double wound spring 38, a central tongue 39 of which bears against a post 40 mounted on the base plate 3. The two free ends 41 and 42 of the spring 38 engage the levers 35 and 36 and urge them upwards against the cross piece 30. When therefore the operator moves the handle as above stated, the cross piece 30 will depress levers 35 and 36 against the tension of spring 38.

Figure 3:
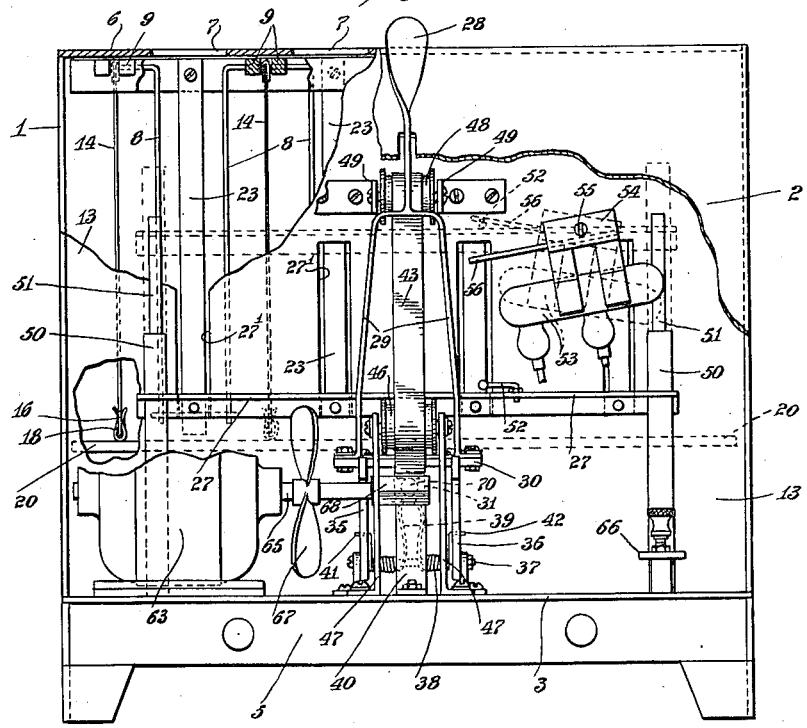
Fig. 3 is an end elevation with parts of the cover removed.

During the forward movement of the slider 30 the bread platforms are lowered by their own weight and by the weight of the bread slices, the positioning of the bread platforms being controlled by a flat cable 43, one end of which is attached to the upright piece 33 of the slider at 44 and the other end of which is attached to the cross bar 27 at 45 near the center thereof. The cable 43 passes over an idler pulley 46 mounted on a port 47 on the base plate 3 and on a pulley 48 mounted in a bracket 49 on the oven wall 13 above the slots 27. The horizontal positioning of the cross bar 27 and of the bread platforms is insured by a sleeve 50 fastened to each end of the cross bar 27. A post 51 fastened to the base plate 3 projects within each sleeve 50, the sleeves being free to slide up and down on these posts. Shortly after the cross piece 27 leaves its top position a finger 52 projecting therefrom will tip a mercury switch 53 from the position shown in dotted lines in Fig. 3 into the position shown in full lines. The mercury switch 52 is clamped in a bracket 54 which may oscillate around a shaft 55 fastened to the separating wall 13, said bracket 54 having a tongue 56 projecting into the path of the finger 52 on the cross bar 27.

Figure 7:
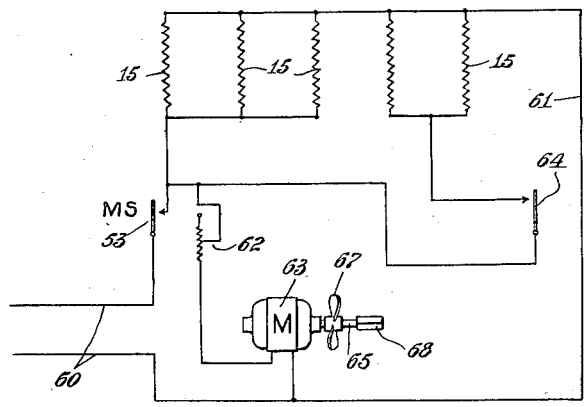
Fig. 7 is a circuit diagram.

When the mercury switch is thus tipped it will close a circuit (Fig. 7) from the power line 60, through the first three resistances 15 in parallel, through conductors 61, back to the other side of the power line 60. A parallel circuit is closed through the mercury switch 53, a variable resistance 62 and a motor 63, and a third parallel circuit through the last two resistances 15, a switch 64 and conductor 61. If the switch 64 (which is suitably mounted on the outside of the casing) is closed, all the resistances 15 will be traversed by current and, depending on the setting of the variable resistance 62 (also suitably mounted on the outside of the casing), the motor 63 will start rotating its shaft 65 at a certain speed. The various electrical connections are suitably established by means of a terminal block 66, mounted on the base plate 3.

The projecting shaft of the motor carries fan blades 67 to cool the compartment within the casing 2 and at its end it carries an impeller 68 having an angular cross section. The impeller 68 is at right angles to the trough 31 and blocks the open end thereof, but is spaced therefrom sufficiently to permit free rotation. As indicated in Fig. 1, the trough 31 is inclined towards the impeller 68, the higher end of the trough being fastened at 69 to the upright 40 which, as shown, forms a leg of the cover plate 32.

Figure 5:
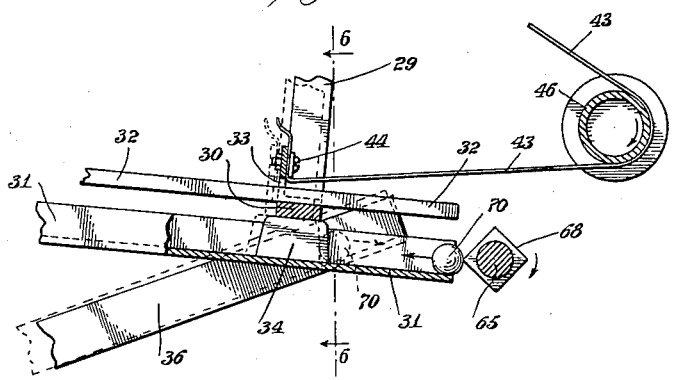
Fig. 5 is a sectional view along lines 5—5 of Fig. 2.
Figure 6:
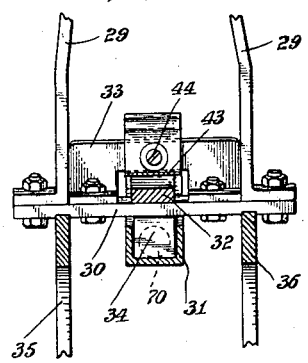
Fig. 6 is a sectional view along lines 6—6 of Fig. 5.

As viewed from the motor side (Fig. 1), the shaft 65 of the electric motor rotates in a clockwise direction and therefore the impeller 68 will drive steel ball 70 towards the slider 34 (see Fig. 5). Owing to the inclined floor of the trough 31 the steel ball 70 will tend to roll back into contact with the impeller 68, the ball being prevented from falling out because its diameter is larger than the separation between the impeller 68 and the end of the trough 31. Whenever the impeller 68 delivers a blow to the ball it will drive it towards the slide 34, the trough 31 and its cover plate 32 serving as a guide to keep the ball moving between the impeller and the slide.

In response to each impact delivered to the slide 34 by the ball 70, the former is caused to advance towards the left (Fig. 5), the impact being sufficient to overcome the frictional resistance between the slide and its trough, between the levers 35, 36 and the cross piece 30 which, as above stated, is attached to the slide, and between the cable 43 and pulleys 46 and 48. However, once this frictional resistance overcomes the force of the impact, the slide is held in its advanced position by the levers 35 and 36 which, under the control of spring 38, rise step by step during each advance step of the slide.

While the slide is thus driven by the ball 70 it will draw upward by means of the cable 43, the cross bar 27 and the bread platforms 24 attached thereto. The slices of bread resting on the bread platforms will therefore be continuously and gradually moved out of the oven compartments. During the travel past the incandescent resistance wires 15, both sides of the bread slices will be toasted, and owing to the fact that the bread moves continuously with respect to the resistances, the toasting will be substantially uniform throughout the surfaces of the bread slices.

When during the upward travel of the cross bar 27 the finger 52 reaches the tongue 56 of the bracket 54 in which mercury switch 53 is suspended, the latter will be tipped in a clockwise direction to open in its contacts the circuits of the motor 63 and the heating elements 15. Owing to its inertia, the motor will continue to rotate until the cross bar 27 is in a position where the finger 52 is above the tongue 56 of mercury switch bracket 54. The bread slices are now protruding through the opening 7 of the oven top 6 about 2½ inches and may be removed by the attendant.

At the beginning of the toasting operation the lower edge of the bread is preferably below the tab 16 of the resistances, the same distance as it is desired the bread will extend out of the casing at the end of the toasting operation.

The speed of rotation of the motor 63 is so timed by means of the rheotstat 62 that just sufficient time elapses between the closing and opening of the circuits by the mercury switch 53 to toast the bread slices to the desired extent. Owing to the fact that there is no physical connection between the timing element constituted by the motor and its shaft and the timed element constituted by the slider 34 and its associated equipment, and that there is no physical connection between the ball 70 and either the timed or timing elements, the attendant may at any time arrest, slow down, speed up, or entirely eliminate the timing operation simply by grasping the handle 28. Through the handle the attendant can operate the timed element at will and thus manually control the toasting operation since the impact of the ball 70 is insufficient to overcome such resistance. The attendant may, for instance, when noticing that the protruding upper edges of the bread slices are insufficiently toasted, again move the slide 34 all the way back to the right so as to permit it again being driven by the ball 70, or he may simply arrest the further elevation of the bread pieces until they are more fully toasted. Again, the attendant may push the slide 34 to the left faster than it would be driven by the ball 70, thus speeding up the toasting operation. Since, as above stated, there is no physical connection between the timing and timed elements, these operations by the attendant can be performed without the necessity of operating any clutches, shifting connections or the like and should for any reason the timing element fail to operate the toaster can be used as a manually operated device until the necessary repairs can be effected.

By opening the switch 64 the device can be used to toast two instead of four slices of bread.

It will be obvious to those skilled in the art that numerous changes can be effected in the embodiment of the invention without departing from the spirit thereof. While the timing arrangement has particular advantages in connection with toasters, it may be used for timing other operations and certain features of the toaster may be used in combination with other types of timing devices. Furthermore, while in my preferred embodiment the bread is gradually and continuously moved with respect to the resistance elements, some of the features of my invention may be embodied in toasters in which automatic bread toasting is effected by different relative movements.

What is claimed is:

1. In an electric toaster, an oven, electric heating elements therein, an electric motor, a shaft rotated by said motor, a movable element physically spaced from said shaft, a ball adjacent said shaft and moved in response to rotation thereof, means for guiding said ball towards said movable element, means controlled by said movable element for moving bread out of said oven, and circuits for said motor and heating elements also controlled by said movable element.

2. In combination, an open-ended trough, a slider within said trough, a spring-pressed lever holding said slider against advancement, an electric motor having a projecting shaft of angular cross section blocking the open end of said trough but spaced therefrom to allow free rotation, a ball within said trough having a larger diameter than the spacing between said trough and shaft and moved in response to the rotation of said shaft, and a circuit for said motor controlled by said slider.

3. In combination, an inclined trough open at its lower end and having a cover plate spaced therefrom, a slider within said trough, a cross piece carried by said slider between the trough and its cover plate, two spring-pressed levers pivoted at one end bearing against the under side of said cross piece, a handle attached to said cross piece, an electric motor having a shaft, an impeller of angular cross section on said shaft and blocking the open end of said trough but spaced therefrom to allow free rotation, a ball within said trough having a larger diameter than the spacing between said trough and impeller and moved in response to the rotation of said impeller, and a circuit for said motor, and a switch in said motor circuit controlled by said cross piece.

4. In an electric toaster, an oven having openings, electric heating elements dividing said oven into compartments in alignment with said openings, a bread platform within each oven compartment, moving means for said platforms outside of said oven, an inclined open-ended trough, a slider within said trough, a spring-pressed lever for holding said slider against displacement, an electric motor having a shaft, an impeller of angular cross section on said shaft and blocking the open end of said trough but spaced therefrom to allow free rotation, a ball within said trough having a larger diameter than the spacing between said trough and impeller and moved in response to the rotation of said impeller, circuits having a common branch for said motor and resistances, a variable resistance in the motor circuit, and a switch in said common branch controlled by said moving means for said platforms.

5. In an electric toaster, an oven having openings in the top of a size to permit passage of a slice of bread, electric heating elements dividing said oven into vertical compartments in alignment with said openings, a bread platform within each oven compartment, extensions of each platform projecting through slots in a side wall of said oven, a bar interconnecting said extensions outside of said oven, an inclined open-ended trough having a cover plate spaced therefrom, a slider within said trough, a cross piece carried by said slider between the trough and its cover plate, two spring-pressed levers pivoted at one end bearing against the under side of said cross piece, a handle attached to said cross piece, a cable having one end attached to the cross piece of the slider and the other to said bar, an electric motor having a shaft, an impeller of angular cross section on said shaft and blocking the open end of said trough but spaced therefrom to allow free rotation, a ball within said trough having a larger diameter than the spacing between said trough and impeller and moved in response to the rotation of said impeller, circuits having a common branch for said motor and resistances, a variable resistance in the motor circuit, and a switch in said common branch controlled by said bar interconnecting the platform extensions but only in one position thereof.

6. A toaster comprising electrical heating means, a food support adjacent said heating means, a switch for controlling the circuit of said heating means, a handle for moving said support from a normal position to any one of a plurality of advanced positions, and means for automatically opening said switch after the lapse of varying intervals of time depending on the advanced position to which the support has been moved, said last mentioned means including frictional means for holding said support in any advanced position and a device for overcoming said frictional means.

7. A toaster comprising an oven, electric heating means associated with said oven, a food support adapted to be moved from a normal position to any one of a plurality of advanced positions within said oven, and automatic means for moving said support outwardly from said oven during the toasting operation, said last mentioned means including frictional means for holding said support in any advanced position and a device for overcoming said frictional means.

8. In a toaster, normally inactive electric heating means, a support normally holding food near said inactive heating means, manual means for moving said support adjacent said heating means into any one of a plurality of advanced positions, means operative upon the moving of the support out of the normal position for closing a circuit for said heating means, frictional means for holding said support in any advanced position, and automatic means including a device for overcoming said frictional means for moving said support from any advanced position back to the normal position whereupon said circuit is opened.

9. A toaster comprising an oven, electric heating means associated with said oven, a food support adapted to be moved from a normal position to any one of a plurality of advanced positions within said oven, automatic means for moving said support outwardly from said oven during the toasting operation, a mercury switch for controlling the circuit of said heating means, a pivotal mounting for said switch, means including said support for tilting said switch in one direction to close said circuit, said automatic means including a timing mechanism having a slide with two ends, a slider adapted to move along said slide, means for gradually advancing said slider to one end of said slide, and means for gradually tilting said switch in the opposite direction to open said circuit as said slider advances to said one end.

GEORGE LAVENBURG.